United States Patent

[11] 3,529,570

[72] Inventor William E. Engelhard
 Apalachin, New York
[21] Appl. No. 727,260
[22] Filed May 7, 1968
[45] Patented Sept. 22, 1970
[73] Assignee Pyro-Serv Instruments, Inc.
 North Arlington, New Jersey
 a corporation of New Jersey

[54] METER CONSTRUCTION
 4 Claims, 3 Drawing Figs.
[52] U.S. Cl. ..................................................... 116/129
[51] Int. Cl. ..................................................... G12b 3/02
[50] Field of Search ........................................... 116/129,
 129N; 324/157

[56] References Cited
UNITED STATES PATENTS
3,087,380 4/1963 Greger et al. ................. 324/157X
3,254,533 6/1966 Tongret ........................ 73/362(R)UX
3,403,656 10/1968 Barry et al. ................... 116/129

Primary Examiner—S. Clement Swisher
Assistant Examiner—Frederick Shoon
Attorney—Sommers and Sommers ABSTRACT: A meter having a needle movable over a scale and a needle retaining device to prevent movement of the needle. The needle retaining device includes a wire which may be moved into intimate engagement with the needle to press the needle against the meter face. The wire is connected to a rotatable shaft which is biased so that the needle is normally immobilized. The meter further includes a lever for rotating said shaft to release the needle to take a reading.

Patented Sept. 22, 1970
3,529,570
FIG.1
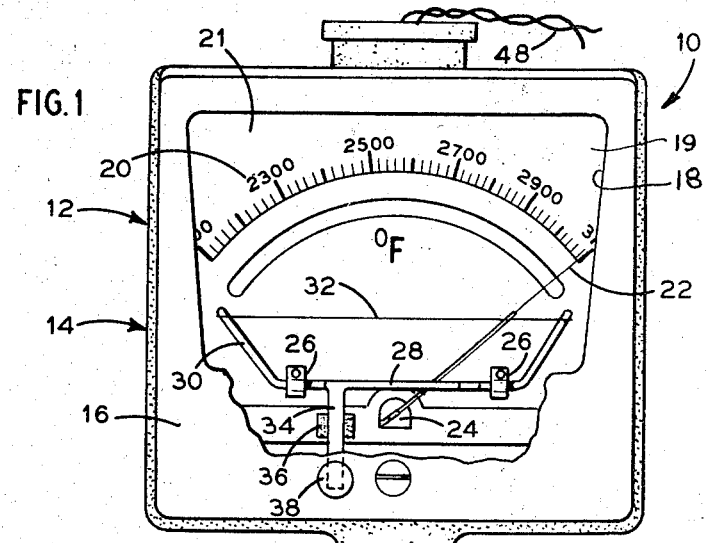
FIG.2
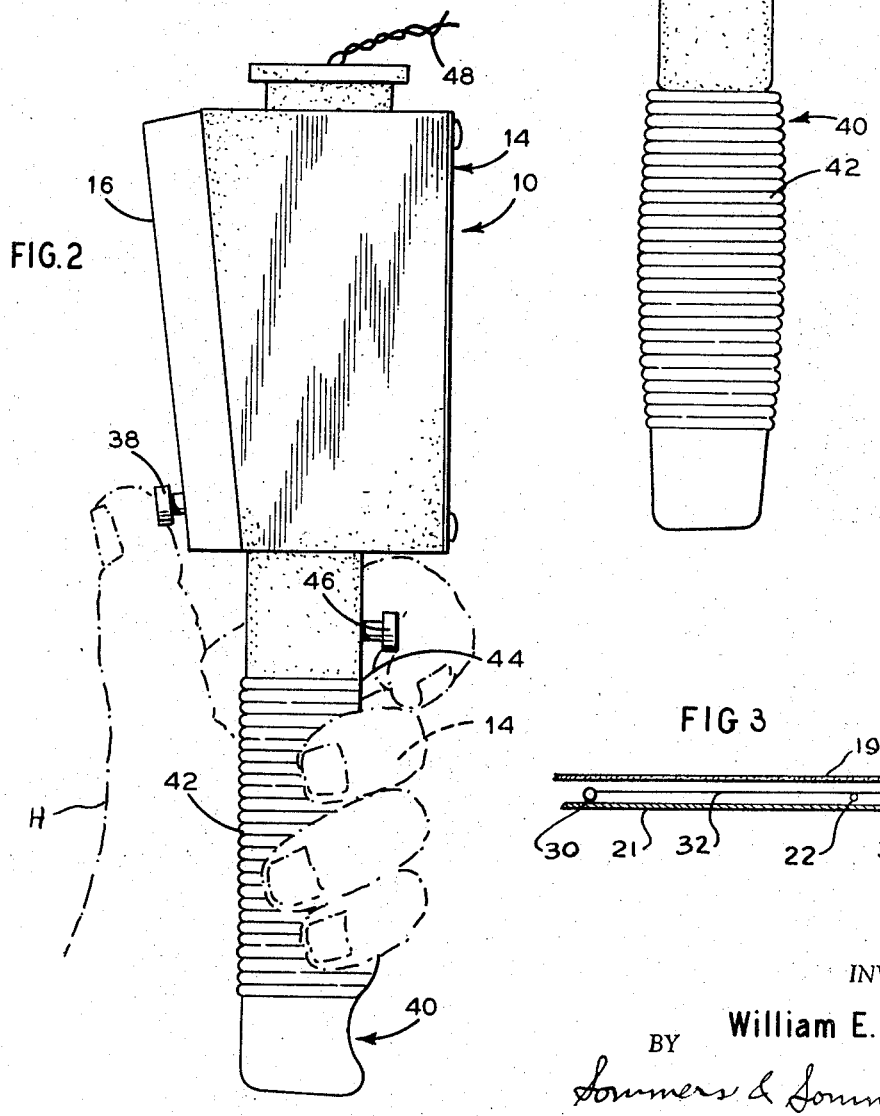
FIG 3
INVENTOR.
William E. Engelhard
BY
Sommers & Sommers
ATTORNEYS

METER CONSTRUCTION

This invention relates generally to an improved meter construction and, more particularly, pertains to a meter construction in which the needle may be selectively immobilized to retain the needle position on an associated scale.

Portable hand-held measuring devices usually are specifically adapted for use in the field rather than for use in a laboratory or the like. Hence, the portable instrument may be moved into an ideal measuring position but one in which an accurate reading becomes extremely difficult. For example, the device may have to be held at arms length to obtain an accurate measurement of a variable quantity. Thus, although the particular measurement may be accurate, the actual reading of the instrument will, at best, be an approximation which depends on the eyesight of the instrument's operator. The operator must look directly through dark glasses at the molten metal in order to control the tip immersion of the meter. Needle retention allows the operator to take a reading and then, after his eyes have grown accustomed to the light, to move away from the heat and glare to view the reading accurately.

Accordingly, an object of the present invention is to provide a meter for a measuring device which retains the reading of the meter.

A more specific object is to provide a meter having means to retain a movable needle in an indicating position.

Another object and feature resides in the novel details of construction which provide a meter of the type described which is rugged, dependable and economic to fabricate.

Accordingly, a meter constructed in accordance with the present invention includes a front face having a scale thereon. A needle is adapted to move over the scale in response to the value of the quantity to be measured. Retaining means is provided to prevent movement of the needle. The retaining means includes a rotatable shaft having needle constraining means connected thereto which is adapted to be moved into engagement with the needle upon movement of the shaft to a first position to press said needle against the face thereby to prevent movement of the needle. Operating means is included for moving said shaft to a second position to release the needle for movement. Biasing means biases the shaft to the first position so that the needle is normally immobilized.

Other features and advantages of the present invention will become more apparent from a consideration of the following detailed description when taken in conjunction with the accompanying drawings, in which:

FIG. 1 is a front elevational view, with parts broken away, of a measuring device incorporating a meter constructed in accordance with the present invention;

FIG. 2 is a side elevational view thereof; and

FIG. 3 is a fragmentary cross-sectional view thereof.

FIGS. 1 and 2 illustrate a portable hand-held measuring device, designated generally by the reference numeral 10, which incorporates a meter 12 constructed according to the present invention. While the meter 12 may be used in conjunction with any instrument adapted to measure the value of a desired quantity, for purposes of the present invention, the meter 12 will be described as a temperature indicating meter. Hence, the device 10 will be described as a pyrometer. However, it is emphasized that this is by way of illustration only and is not to be interpreted as a limitation of the invention.

The pyrometer 10 includes a housing 14 having a front wall 16. Provided in the front wall 16 is an opening 18 in which is positioned a transparent member 19 (such as glass) through which the scale 20 on the face 21 of the meter 12 is visible. In other words, the meter 12 is received within the housing 14. The meter 12 is of the type which includes a needle 22, one end of which is pivotally connected to the meter movement 24.

Retaining means is provided to prevent movement of the needle 22. More specifically, spaced loops 26 are provided which are affixed to the meter face 21. Extending through the loops 26 and being rotatable with respect thereto is a shaft 28. The shaft 28 is spaced below the lower edge of the opening 18. The shaft 28 includes tapering end portions 30 which extend upwardly toward the scale 20 and outwardly toward the side walls of the housing 14. The spacing between the ends of the end portions 30 is such that if the end portions 30 were extended, the scale 20 would be positioned therebetween. Connected between the ends of the end portions 30 is a needle constraining means in the form of a wire 32.

The relative spacing of the parts in the retaining means is shown in FIG. 3. The spacing between the wire 32 and the scale face 21 must be tightly maintained and controlled across the entire length of the wire 32 to avoid crunching the needle 22 against the scale face 21 or missing the needle 32 at the high spot of the wire 32. In order to accomplish these objectives the space is controlled by using a wire 32 of suitable diameter and spring properties. The spring properties are used to keep the clamping wire straight and also to allow the high end of wire 32 to move down towards the scale 21. The clamping wire is stretched across and soldered onto a notch at each end portion 30 of the shaft 28, the end portions 30 having been pinched to enable soldering of the wire to the notches and then released to tension the wire 32. The depth of the notch can be made to exactly match the wire clearance. Any slight unevenness of the end portion 30 are taken care of on being depressed, by the torquing action of the compressible member 36 and the lever 34.

To be more specific, when the shaft 28 is rotated in the counter-clockwise direction, as seen looking from the left in FIG. 1, the wire 32 is moved into intimate contact with the needle 22 to press the needle enough to hold but not against the meter face 21. Accordingly, the meter needle 22 will be immobilized or prevented from changing its position. However, when the shaft is rotated in the opposite direction the wire 32 is moved away from the needle 22 thereby to free the needle for movement over the length of the scale 20 in response to the current flow.

Movement of the shaft 28 between needle constraining and needle moving positions is effected by operating means which includes a lever 34, one end of which is rigidly connected to the shaft 28. When the other end of the lever 34 is moved toward the meter face 21, the shaft 28 is rotated to the position wherein the needle has freedom of movement. A compressible member 36, such as a spring, or a foam rubber pad to control grounding or static problems, or the like, is connected to the meter face and is adapted to engage the under surface of the lever 34 to bias the shaft 28 to the needle constraining position to immobilize the needle.

The operating means further includes a plunger 38 slidably received through an appropriate bore in the front wall 16 which is positioned to engage the free end of the lever 34. Movement of the plunger 38 inwardly causes the free end of the lever 34 to move toward the meter face to free the needle 22 in the manner noted above.

Depending from the housing 14 is a handle 40 having a front surface 42 and a rear surface 44. The handle 40 is provided with ribs spaced throughout its length to facilitate holding the device 10. Extending outwardly from the rear surface 44 of the handle 40 is a depressible push-button 46 (FIG. 2) which is adapted to cause energization of the meter when it is depressed. For example, depression of the push-button 46 may close a switch which connects the meter movement 24 with an energizing circuit.

As shown clearly in FIG. 2, the push-button 46 and the plunger 38 are sized and positioned to be operated by one hand thereby freeing the other hand of the operator. More particularly, the handle 40 is grasped by a hand as shown by the dashed lines H. The fingers wrap around the handle with the forefinger resting on the push-button 46. The thumb rests on the plunger 38.

As noted above, in this illustrative embodiment the device 10 is a pyrometer. Accordingly, in operation a thermocouple 48 is placed in contact with the object whose temperature is to be measured. Thereafter the handle 40 is grasped by the operator in the manner noted above and the push-button 46 and the plunger 38 both are depressed. This action energizes the meter movement 24 and releases the needle 22 for movement. Thus, the needle 22 moves to a position indicative of the temperature of the object. The plunger 38 is then released to allow the shaft 28 to rotate to the needle constraining position under the biasing influence of the member 36. Hence, the needle 22 will be "locked" in position and will not be able to move even though the device 10 is moved or otherwise jostled. The push-button 46 thereafter is released.

Accordingly, the operator may then remove the thermocouple from the object and move the device 10 to read the meter then or at a later time or another location more convenient to him or to a position in which the meter 12 easily is readable. In other words, since the needle is fixed in position it is not necessary to read the meter while the device is still connected to the measured object. Thus, the device 10 may be moved to a position wherein the operator may take an accurate reading of the meter.

Hence, a meter has been disclosed which is simple to fabricate and operate and which maintains the needle in position so that accurate readings may be taken regardless of the orientation of the device during the measuring operation.

While a preferred embodiment of the invention has been disclosed it will become obvious that numerous omissions, changes and additions may be made in such embodiment without departing from the spirit and scope of the present invention.

I claim:

1. A meter having a scale thereon:
   a needle mounted for movement over said scale;
   retaining means for preventing movement of said needle, said retaining means comprising a shaft movably mounted in said meter in spaced relation to said scale, spaced out-turned ends on said shaft;
   a flexible member secured at its ends to the out-turned ends of the shaft and held taut between said out-turned ends;
   said flexible member being adapted, on movement of the shaft to a first position, to be thereby moved into engagement with said needle, to engage the needle; and
   means for biasing said shaft to said first position to so engage said needle.

2. In a meter as set forth in claim 1, a lever connected at one end to said shaft to move said shaft from said first position and thus release said needle from said flexible member.

3. In a meter as in claim 2, said shaft biasing means comprising a compressible member engaging said lever to move said shaft to said first position.

4. In a meter as in claim 3, a depressible meter operating button movably mounted in said meter and extending from the meter, adapted to be depressed by the finger to energize said meter;
   and means for engaging said lever mounted in said meter at a point opposite the button: and
   said means for engaging the lever and said meter button being adapted to be operated by one hand to simultaneously energize said meter and release said needle for movement.